(12) United States Patent
Xu et al.

(10) Patent No.: US 6,441,449 B1
(45) Date of Patent: Aug. 27, 2002

(54) MEMS VARIABLE CAPACITOR WITH STABILIZED ELECTROSTATIC DRIVE AND METHOD THEREFOR

(75) Inventors: Ji-Hai Xu; Jenn-Hwa Huang, both of Gilbert; John Michael Parsey, Jr., Phoenix, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/981,014

(22) Filed: Oct. 16, 2001

Related U.S. Application Data

(62) Division of application No. 09/496,930, filed on Feb. 2, 2000.

(51) Int. Cl.[7] .............................................. H01L 21/00
(52) U.S. Cl. ..................... 257/414; 257/532; 257/534; 257/415; 257/417; 257/312; 331/117; 331/177; 331/36; 331/16; 331/34; 438/379; 455/260; 361/278; 361/281; 361/283.2; 361/283.4; 505/210
(58) Field of Search ........................... 331/117, 177, 331/36, 16, 34; 455/260, 76, 77, 87, 197.2; 334/58, 78; 318/662; 257/312, 414, 415, 417, 532, 534, 535; 342/372, 368; 216/2, 33, 36, 80; 438/379

(56) References Cited

U.S. PATENT DOCUMENTS

| 5,880,921 | A | * | 3/1999 | Tham et al. ................. 361/233 |
| 6,094,102 | A | * | 7/2000 | Chang et al. .................. 331/17 |
| 6,110,792 | A | * | 8/2000 | Kalnitsky et al. ............ 438/379 |
| 6,160,230 | A | * | 12/2000 | McMillan et al. ........... 200/181 |
| 6,242,989 | B1 | * | 6/2001 | Barber et al. ................ 331/177 |
| 6,327,463 | B1 | * | 12/2001 | Welland ...................... 455/260 |
| 6,335,665 | B1 | * | 1/2002 | Mendelsohn ................. 333/139 |
| 6,347,237 | B1 | * | 2/2002 | Eden et al. .................. 505/210 |

* cited by examiner

Primary Examiner—Nathan J. Flynn
Assistant Examiner—Fazli Erdem
(74) Attorney, Agent, or Firm—Miriam Jackson

(57) ABSTRACT

A micro electro-mechanical systems device having variable capacitance is controllable over the full dynamic range and not subject to the "snap effect" common in the prior art. The device features an electrostatic driver (120) having a driver capacitor of fixed capacitance (121) in series with a second driver capacitor of variable capacitance (126). A MEMS variable capacitor (130) is controlled by applying an actuation voltage potential to the electrostatic driver (120). The electrostatic driver (120) and MEMS variable capacitor (130) are integrated in a single, monolithic device.

18 Claims, 4 Drawing Sheets

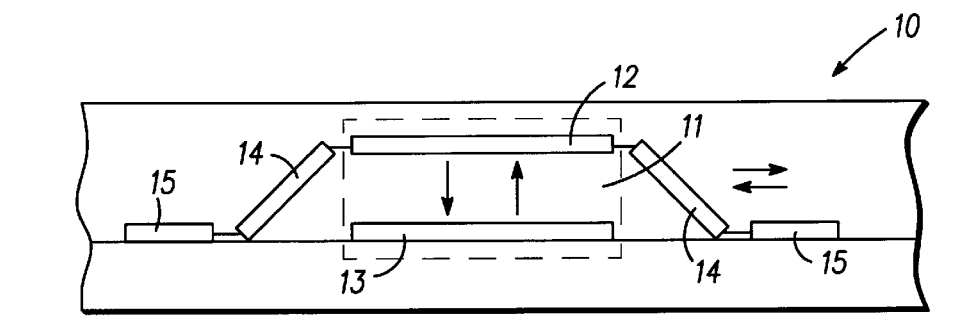
FIG. 1 —PRIOR ART—
FIG. 2 —PRIOR ART—
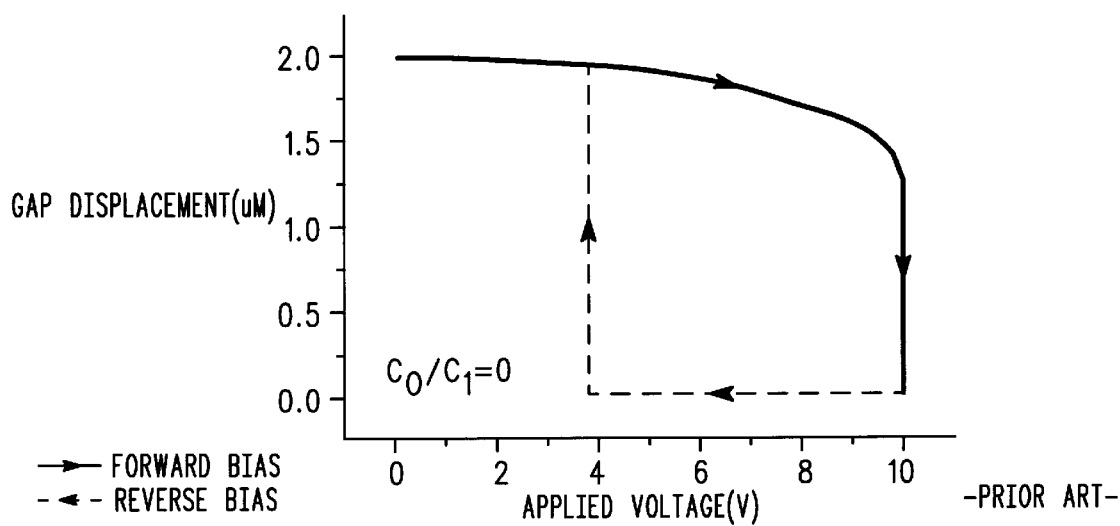
FIG. 3 —PRIOR ART—

MEMS VARIABLE CAPACITOR WITH STABILIZED ELECTROSTATIC DRIVE AND METHOD THEREFOR

This application is a division of Ser. No. 09/496,930 filed Feb. 2, 2000.

FIELD OF THE INVENTION

This invention relates, in general, to micro electromechanical system (MEMS) devices and, more particularly, to a high quality (high-Q) variable capacitor fabricated using MEMS technology.

BACKGROUND OF THE INVENTION

One prior art type of variable capacitor, known as the thermal drive variable capacitor 10, is illustrated in FIG. 1. In this prior art version, a dielectric gap 11 between two capacitor plates 12 and 13 is controlled or altered by means of thermal expansion of lateral components. As shown in FIG. 1, each end of an upper plate 12 of a capacitor is connected to one end of a movable, hinged diagonal component 15. The other end of the diagonal component is connected to a lateral component 14. Movement of lateral component 14, which is controlled by thermal devices, causes the hinged diagonal components 15 to translate the lateral movement to vertical movement of upper plate 12. The vertical movement of upper plate 12 varies the capacitance of the device.

The drawbacks to thermal drive variable capacitor 10 are several. The mechanical design of the device is complicated resulting in a costly and inefficient manufacturing process. Also, the complicated design of the thermal drive negatively impacts the reliability of the device. The translation of lateral movement to vertical movement intrinsic to thermal drive devices has the negative effect of increasing the size of the device. Also, the thermal expansion and contraction operation of the device is inefficient, thus resulting in slow speed in varying the capacitance. Furthermore, thermal operation requires significantly more power consumption than electrostatically driven MEMS devices of similar capability.

Another prior art variable capacitor 20 is illustrated in FIG. 2. MEMS variable capacitor 20 has at least one driver 21, itself a simple variable capacitor, for determining the displacement of a dielectric membrane 22 and a variable capacitor region for employment with an external circuit (not shown). The displacement of dielectric membrane 22 is determined by the application of a voltage potential across drivers 21.

The application of a voltage to the drivers causes an electrostatic attraction between the driver electrodes. This electrostatic attraction results in a downward movement of dielectric membrane 22, thereby causing a downward displacement. This reduction in the gap between the upper 23 and lower 24 capacitor plates results in a corresponding variance in capacitance.

Hence, a need exists for a high-Q capacitor that is reliable, cost efficient, and has continuous dynamic response over the full displacement of the dielectric membrane.

BRIEF DESCRIPTION OF THE DRAWINGS

FIG. 1 is a simplified cross-sectional view of a prior art thermal drive variable capacitor;

FIG. 2 is a cross-sectional view of another prior art MEMS variable capacitor;

FIG. 3 is a chart comparing actuation voltage potential with displacement of a membrane for forward and reverse bias of prior art MEMS variable capacitors;

DETAILED DESCRIPTION OF THE DRAWINGS

One of the forces intrinsic to MEMS variable capacitors with electrostatic drive is the restoring force. The restoring force is a mechanical force that tends to return the dielectric membrane to its initial or rest position, i.e., the position of the membrane with no voltage potential across the control electrodes. When the voltage potential across the driver electrodes is lessened or removed, the restoring force causes the dielectric membrane displacement to increase as the dielectric membrane returns to its initial position, thereby varying the capacitance of the MEMS variable capacitor.

One of the limitations of the prior art MEMS variable capacitor shown in FIG. 2, is reflected in the relationship between the restoring force $F_R$ and the electrostatic force $F_{ES}$. The restoring force $F_R$ for the dielectric membrane is linear with respect to the displacement. However, the electrostatic force $F_{ES}$ is inversely proportional to the square the difference between the original gap and the displacement. Therefore, as the actuation voltage increases, causing further displacement of the dielectric membrane, $F_{ES}$ dominates over $F_R$ which results in the dielectric membrane clamping in the closed or fully displaced position. This is known as the "Pull-in" or "snap effect" and as the graph in FIG. 3 illustrates, the result is a two-state or bi-stable capacitor. Furthermore, when the actuation voltage is reduced, the membrane will remain fully deflected until $F_R$ can dominate $F_{ES}$. Thus, an abrupt form of hysteresis is evident in the prior art MEMS variable capacitor as shown in FIG. 3. In addition, the prior art MEMS variable capacitor exhibits poor noise margins because of the above limitations.

Other limitations of the prior art MEMS variable capacitor follow from the snap effect. For example, in most applications any capacitor variability is limited to approximately one third of the sum of the available dielectric membrane deflection plus the thickness of the dielectric membrane divided by the dielectric constant, as shown in the following equation:

$$d = (g_0 + g_1/\in)/3 \quad (1)$$

where:

d is the dielectric membrane displacement;

$g_0$ is the effective gap between the lower surface of the dielectric membrane and the upper surface of the lower electrode;

$g_1$ is the thickness of the dielectric membrane; and $\in$ is the dielectric constant.

Therefore, precise actuation voltage control is required, particularly near the pull-in point, i.e., the point on the curve where the membrane will clamp, which is shown in FIG. 3 as approximately one third of the available displacement.

Furthermore, the snap effect results in a device with a poor noise margin. That is, voltage spikes will cause the membrane to clamp. Thus, as a practical matter, the prior art MEMS variable capacitor is typically employed as a bi-stable device, rather than as a true variable capacitor that is controllable over a continuum of capacitances.

Figure 4:
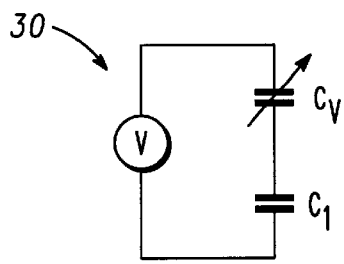
FIG. 4 is a schematic diagram of the driver portion of a MEMS variable capacitor in accordance with an embodiment of the present invention.
Figure 5:
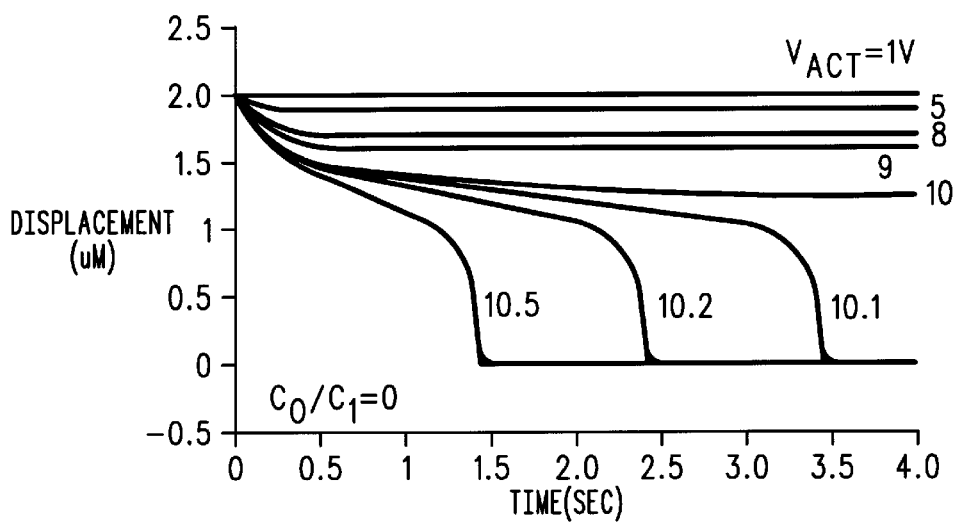
FIGS. 5–8 are charts which illustrate the dynamic response of the MEMS variable capacitor of FIG. 4.

Now referring to FIG. 4, a schematic diagram of an electrostatic driver portion 30 of a MEMS variable capacitor in accordance with an embodiment of the present invention is shown. The electrostatic driver essentially combines a fixed capacitor $C_1$ in series with a variable capacitor $C_V$. Both $C$, and $C_V$ are fabricated in the same monolithic, integrated device. The addition of $C_1$ alters equation (1) by introducing the ratio of $C_V$ (which equals $C_0$, the initial drive capacitance at zero voltage) to $C_1$ and the stable condition becomes:

$$d = (g_0 + g_1/\in) * (1 + C_0/C_1)/3 \quad (2)$$

The inclusion of the $C_1$, and thus the term $(1+C_0/C_1)$, increases the effective displacement range of the dielectric membrane for controlling the variable capacitance. Furthermore, the system is stable in the full deflection range if the following condition is satisfied:

$$C_0/C_1 \geq (2 - g_1/\in * g_0)/(1 + g_1/\in * g_0) \quad (3)$$

Thus, the device is stable over the entire operating range if $C_0/C_1$ is greater than or equal to approximately 2. FIGS. 5–8 illustrate the dynamic response of the circuit at several different values of $C_0/C_1$. The exemplary values for the other relevant parameters ($g_0$, $g_1$, and $\in$) for the purposes of FIGS. 5–8 are $g_0$=2 μm, $g_1$=1 μm, and $\in$=3.9. Note that for the ratio of $C_0/C_1$=0 (FIG. 5), i.e., only one capacitor, the snap effect occurs at approximately 10 volts and only approximately one third of the displacement is useable. When $C_0/C_1$=1 (FIG. 6), approximately 60 percent (1.2/2) of the displacement is useable. For $C_0/C_1$=1.5 (FIG. 7), approximately 90 percent (1.8/2) of the displacement is useable. And for $C_0/C_1$=2 (FIG. 8), virtually 100 percent of the displacement is useable.

Figure 6:
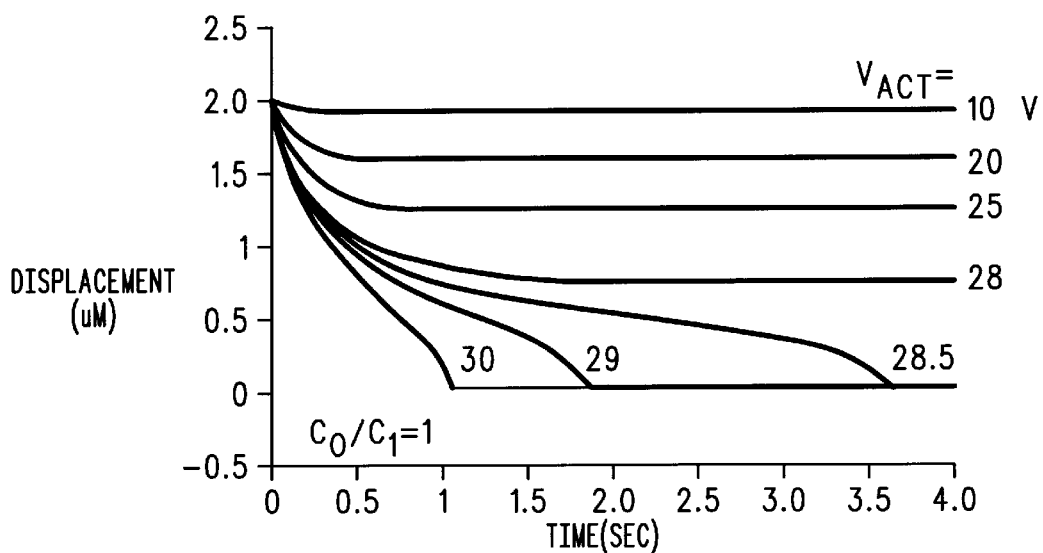
Figure 7:
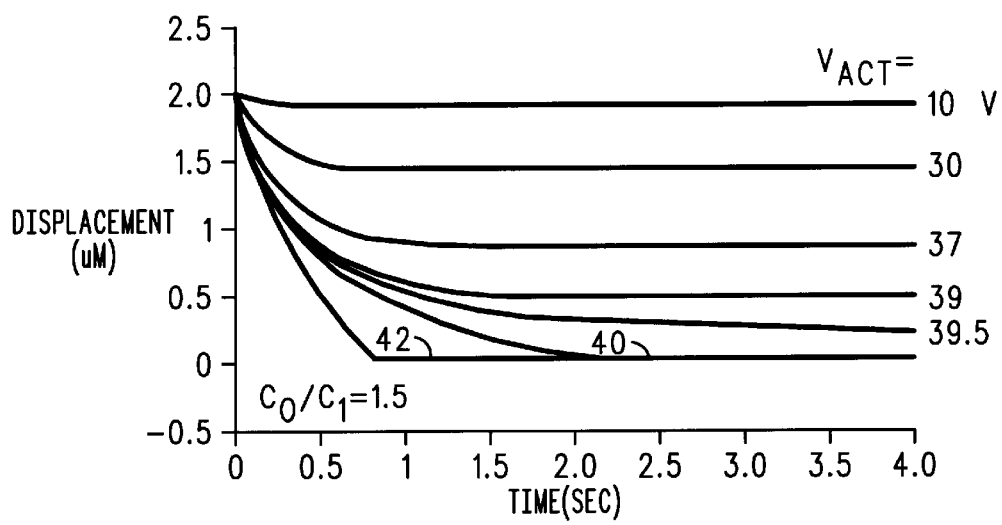
Figure 8:
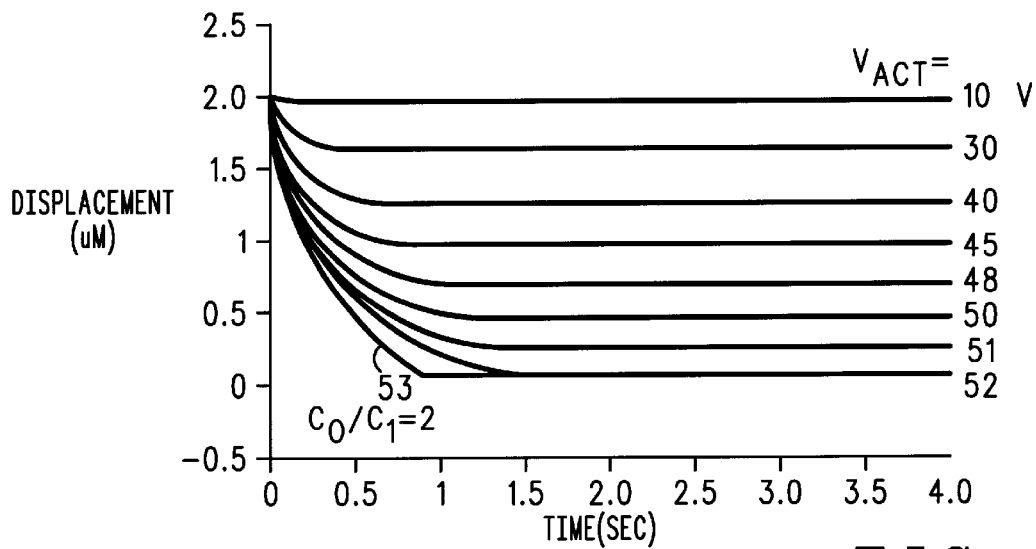
Figure 9:
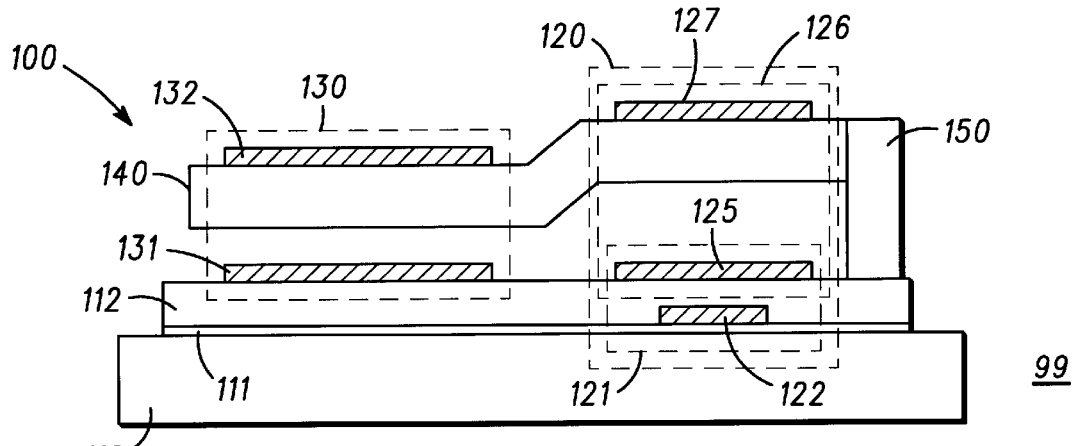
FIG. 9 is a cross-sectional view of a MEMS variable capacitor in accordance with another embodiment of the present invention.

Now referring to FIG. 9, the structural aspects of a MEMS variable capacitor in accordance with an embodiment of the present invention are disclosed. MEMS variable capacitor 99 with stabilized electrostatic drive 100 is comprised of at least one driver capacitor pair 120 having a driver fixed capacitor 121 in series with a driver variable capacitor 126. FIG. 6 illustrates MEMS variable capacitor 99 with an electrostatic driver comprised of a single driver capacitor pair 120.

MEMS variable capacitor 100 also has a variable capacitor 130 that connects to the remainder of the circuit (not shown). Variable capacitor 130 is comprised of a lower plate 131, an upper plate 132, and a portion of a dielectric membrane 140. Dielectric membrane 140 displaces vertically, as shown by the bold arrow, in response to the application of an actuation voltage potential to driver capacitor pair 120, thereby varying the capacitance of variable capacitor 130.

MEMS variable capacitor 99 with stabilized electrostatic drive 100 is fabricated beginning with a substrate 110, preferably a non-conductive substrate. In the preferred embodiment, an isolation layer of non-conductive material 111, such as silicon oxide or silicon nitride, is deposited on substrate 110 to facilitate the manufacturing process. In a subsequent step, a metal layer is deposited to form a lower electrode 122 of driver fixed capacitor 121 on the isolation layer. Alternatively the metal layer may be deposited directly on substrate 110. Lower electrode 122 of driver fixed capacitor 121 is connected to the remainder of the actuation circuit by any number of conventional means such as a metal trace.

Subsequently, another isolation layer of non-conductive material 112 is fabricated over isolation layer 111 and lower electrode 122 of driver fixed capacitor 121. Thus, the lower electrode 122 of fixed capacitor 121 is electrically isolated from the remainder of the device. Then, another metal layer is deposited on an upper surface of second isolation layer 112 to form lower plate 131 for variable capacitor 130 and a dual-use electrode 125. Dual-use electrode 125 serves as the upper electrode of driver fixed capacitor 121 and the lower electrode of the driver variable capacitor 126.

Subsequent steps include the formation of a sacrificial layer (not shown), i.e., a temporary layer used to establish the effective gap $g_0$ between dielectric membrane 140 and dual-use electrode 125, the formation of an anchor post 150 from which dielectric membrane 140 is suspended, the formation of dielectric membrane 140 and the deposition of another metal layer on the upper surface of dielectric membrane 140, which forms upper plate 132 of variable capacitor 130, and an upper electrode 127 of driver variable capacitor 126.

Ultimately the sacrificial layer is removed so that dielectric membrane 140 is free to displace vertically in response to the application of the actuation voltage. In the embodiment illustrated in FIG. 9, there is an offset in dielectric membrane 140 to adjust the gap between lower plate 131 and dielectric membrane 140 to be slightly different from the gap $g_0$. However, in alternate embodiments, the offset may be varied or even eliminated, depending on the application of the device.

Figure 10:
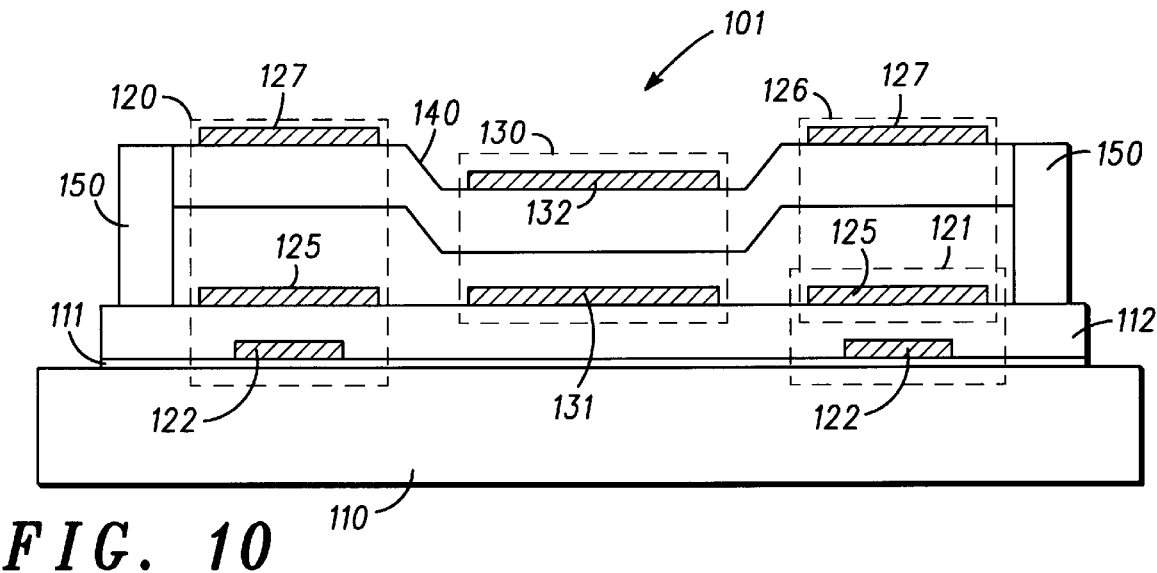
FIG. 10 is a cross-sectional view of a MEMS variable capacitor in accordance with yet another embodiment of the present invention.

Now referring to FIG. 10, a MEMS variable capacitor 101 with stabilized electrostatic drive in accordance with another embodiment is illustrated. MEMS variable capacitor 101 includes a substrate 110 and isolation layers 111 and 112, as in the previous embodiment. However, MEMS variable capacitor 101 is comprised of two driver capacitor pairs 120. Each of the driver capacitor pair 120 is comprised of a driver fixed capacitor 121 and a driver variable capacitor 126. Driver fixed capacitor 121 is comprised of a lower electrode 122 and a dual-use electrode 125. Also, the driver variable capacitor is comprised of dual-use electrode 125 and an upper electrode 127. Thus, as in the previous embodiment, dual-use electrode 125 serves as the upper electrode of driver fixed capacitor 121 and the lower electrode of driver variable capacitor 126.

Each end of dielectric membrane 140 is connected to an anchor 150. Variable capacitor 130, comprising a lower plate 131, an upper plate 132 and a portion of dielectric membrane 140, is located in the approximate center of dielectric membrane 140. The actuation voltage is simultaneously applied to each of the driver capacitor pairs 120 to control the deflection of dielectric membrane 140.

Figure 11:
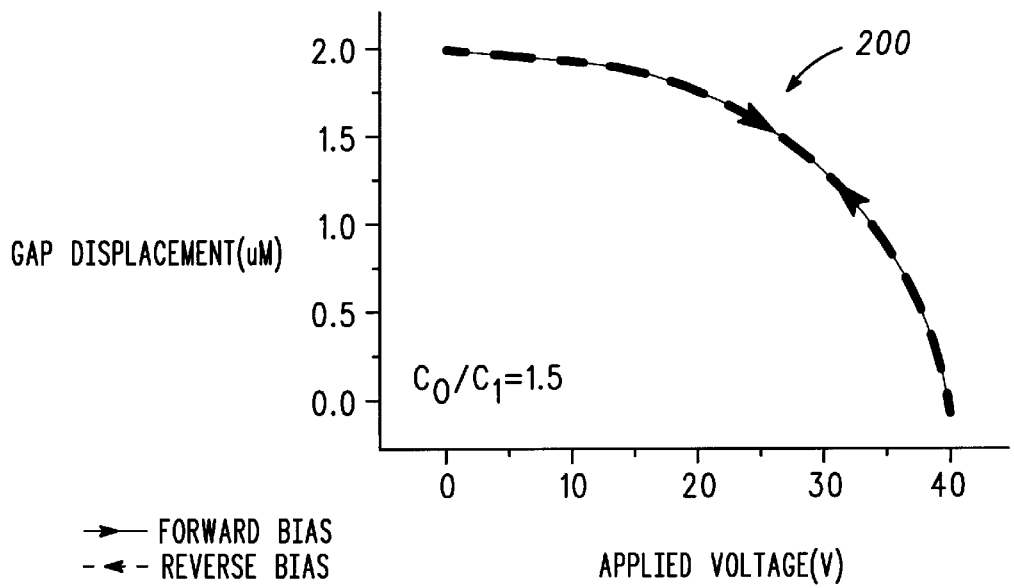
FIG. 11 is a chart comparing actuation voltage potential with displacement of the membrane for forward and reverse bias for a MEMS capacitor in accordance with an embodiment of the present invention.

FIG. 11 is a chart 200 comparing actuation voltage potential with displacement of the membrane for forward and reverse bias for a MEMS capacitor in accordance with an embodiment of the present invention. Chart 200 is a plot of actuation voltage versus displacement for a typical device.

Note that the forward bias curve is virtually identical to the reverse bias curve. The snap effect is effectively eliminated and there is no abrupt hysteresis as was common in prior art devices.

Although the invention has been particularly shown and described with reference to a preferred embodiment thereof, it will be understood by those skilled in the art that changes in form and detail may be made therein without departing from the spirit and scope of the invention.

What is claimed is:

1. A Micro Electro-Mechanical system (MEMS) device, comprising:
    an electrostatic MEMS driver, comprising:
        a first driver capacitor having a fixed capacitance; and
        a second driver capacitor having a variable capacitance, wherein the first driver capacitor is in series with the second driver capacitor; and
    a MEMS variable capacitor, wherein the MEMS variable capacitor is controlled by the electrostatic MEMS driver.

2. The MEMS device of claim 1, wherein the MEMS variable capacitor comprises:
    a first plate coupled to a substrate;
    a portion of a dielectric membrane; and
    a second plate coupled to the dielectric membrane.

3. The MEMS device of claim 2, wherein the MEMS variable capacitor is controlled by applying an actuation voltage potential to the electrostatic MEMS driver.

4. The MEMS device of claim 1, wherein the first driver capacitor comprises:
    a first electrode coupled to a substrate; and
    a dual-use electrode wherein the dual-use electrode is separated from the first electrode by an isolation layer.

5. The MEMS device of claim 4, wherein the second driver capacitor comprises:
    the dual-use electrode; and
    a second electrode coupled to the dielectric membrane.

6. The MEMS device of claim 1, wherein the electrostatic MEMS driver provides a continuous dynamic response of the MEMS variable capacitor over an effective displacement range of the dielectric membrane.

7. The MEMS device of claim 6, wherein the continuous dynamic response for a forward bias is virtually identical to a reverse bias of the device.

8. A Micro Electro-Mechanical system (MEMS) device, comprising:
    a driver capacitor pair, comprising:
        a first driver capacitor having a fixed capacitance; and
        a second driver capacitor having a variable capacitance, wherein the first driver capacitor is in series with the second driver capacitor; and
    a MEMS variable capacitor, wherein the MEMS variable capacitor is controlled by the driver capacitor pair.

9. The MEMS device of claim 8, wherein the MEMS variable capacitor comprises:
    a lower plate coupled to a substrate;
    a dielectric membrane; and
    an upper plate coupled to the dielectric membrane.

10. The MEMS device of claim 8, wherein the MEMS variable capacitor is controlled by applying an actuation voltage potential to the driver capacitor pair.

11. The MEMS device of claim 8, wherein the first driver capacitor comprises:
    a lower electrode coupled to a substrate; and
    a dual-use electrode, wherein the dual-use electrode is separated from the lower electrode by an isolation layer.

12. The MEMS device of claim 11, wherein the second driver capacitor comprises:
    the dual-use electrode; and
    an upper electrode coupled to the dielectric membrane.

13. The MEMS device of claim 8, wherein the driver capacitor pair provides a continuous dynamic response of the MEMS variable capacitor over an effective displacement range of the dielectric membrane.

14. The MEMS device of claim 13, wherein the continuous dynamic response for a forward bias is virtually identical to a reverse bias of the device.

15. The MEMS device of claim 8, wherein the device further comprises a second driver capacitor pair, comprising:
    a third driver capacitor having a fixed capacitance; and
    a fourth driver capacitor having a variable capacitance, wherein the third capacitor is in series with the fourth capacitor.

16. The MEMS device of claim 15, wherein the second driver capacitor pair is in parallel with the first driver capacitor pair.

17. A micro electro-mechanical system device, comprising:
    a substrate;
    an isolation layer fabricated over the substrate;
    a MEMS variable capacitor, comprising:
        a lower plate coupled to the substrate;
        a dielectric membrane; and
        an upper plate coupled to the dielectric membrane;
    a first driver capacitor having a fixed capacitance comprising:
        a lower electrode coupled to the substrate; and
        a dual-use electrode wherein the dual-use electrode is separated from the lower electrode by the isolation layer; and
    a second driver capacitor having a variable capacitance, in series with the first driver capacitor, the second driver capacitor comprising:
        the dual-use plate; and
        an upper electrode coupled to the dielectric membrane;
    wherein the MEMS variable capacitor, the first driver capacitor and the second driver capacitor are fabricated on a monolithic, integrated device.

18. The device of claim 17, further comprising:
    a third driver capacitor having a fixed capacitance comprising:
        a second lower electrode coupled to the substrate; and
        a second dual-use electrode wherein the second dual-use electrode is separated from the second lower electrode by the isolation layer; and
    a fourth driver capacitor having a variable capacitance, in series with the third driver capacitor, the fourth driver capacitor comprising:
        the second dual-use plate; and
        a second upper electrode coupled to the dielectric membrane.

* * * * *